(12) United States Patent
Chen et al.

(10) Patent No.: US 12,249,723 B2
(45) Date of Patent: Mar. 11, 2025

(54) BATTERY, ELECTRIC DEVICE, AND METHOD AND DEVICE FOR PREPARING BATTERY CELL

(71) Applicant: CONTEMPORARY AMPEREX TECHNOLOGY (HONG KONG) LIMITED, Hong Kong (CN)

(72) Inventors: Xinxiang Chen, Ningde (CN); Denghua Lin, Ningde (CN); Yulian Zheng, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/470,442

(22) Filed: Sep. 20, 2023

(65) Prior Publication Data

US 2024/0006687 A1 Jan. 4, 2024

Related U.S. Application Data

(63) Continuation of application No. PCT/CN2021/125917, filed on Oct. 22, 2021.

(51) Int. Cl.
| | |
|---|---|
| H01M 50/103 | (2021.01) |
| H01M 50/503 | (2021.01) |
| H01M 50/507 | (2021.01) |
| H01M 50/516 | (2021.01) |

(52) U.S. Cl.
CPC ....... *H01M 50/103* (2021.01); *H01M 50/503* (2021.01); *H01M 50/507* (2021.01); *H01M 50/516* (2021.01); *H01M 2220/20* (2013.01)

(58) Field of Classification Search
None
See application file for complete search history.

(56) References Cited

U.S. PATENT DOCUMENTS

| | | |
|---|---|---|
| 10,312,552 B2 | 6/2019 | Liang et al. |
| 10,559,806 B2 | 2/2020 | Negishi et al. |

(Continued)

FOREIGN PATENT DOCUMENTS

| | | |
|---|---|---|
| CN | 107534101 A | 1/2018 |
| CN | 110021721 A | 7/2019 |

(Continued)

OTHER PUBLICATIONS

The international search report received in the corresponding international application PCT/CN2021/125917, mailed Jul. 19, 2022.

(Continued)

*Primary Examiner* — Matthew T Martin
*Assistant Examiner* — Ankith R Sripathi
(74) *Attorney, Agent, or Firm* — Kilpatrick Townsend & Stockton LLP

(57) ABSTRACT

Embodiments provide a battery, an electric device, and a method and a device for preparing battery cell, featuring a higher space utilization. The battery includes: a plurality of battery cells, where the plurality of battery cells are arranged in a first direction, a first region on an edge of a first surface of each of the plurality of battery cells is recessed to form a first recess, a first electrode terminal of each of the battery cells is protrusively provided on a second surface of the battery cell, the first surface and the second surface are perpendicular to the first direction, and the plurality of battery cells include a first battery cell and a second battery cell that are adjacent; and a first busbar configured to connect first electrode terminals of the adjacent first battery cell and second battery cell.

16 Claims, 14 Drawing Sheets

(56) References Cited

U.S. PATENT DOCUMENTS

| | | | |
|---|---|---|---|
| 2017/0018824 A1* | 1/2017 | Maguire | H01M 10/6554 |
| 2017/0256827 A1 | 9/2017 | Liang et al. | |
| 2018/0102528 A1 | 4/2018 | Negishi et al. | |
| 2019/0341594 A1* | 11/2019 | Morisato | H01M 50/534 |
| 2020/0083514 A1 | 3/2020 | Enomoto et al. | |
| 2021/0203040 A1* | 7/2021 | Okada | H01M 50/50 |
| 2022/0166114 A1* | 5/2022 | Yun | H01M 50/505 |
| 2022/0367978 A1* | 11/2022 | Pan | H01M 50/503 |
| 2023/0066980 A1* | 3/2023 | Lee | B23K 26/082 |

FOREIGN PATENT DOCUMENTS

| | | |
|---|---|---|
| CN | 306785829 S | 8/2021 |
| EP | 4089775 A1 | 11/2022 |
| EP | 4089804 A1 | 11/2022 |
| JP | 2017195666 A | 10/2017 |
| JP | 2019212561 A | 12/2019 |
| WO | 2019049377 A1 | 3/2019 |
| WO | 2019123619 A1 | 6/2019 |
| WO | 2019186932 A1 | 10/2019 |

OTHER PUBLICATIONS

The written opinion received in the corresponding international application PCT/CN2021/125917, mailed Jul. 19, 2022.

The extended European search report received in the corresponding European application 21961109.2, mailed Feb. 9, 2024.

Office Action received in the corresponding European application 21961109.2, mailed Aug. 27, 2024.

* cited by examiner

BATTERY, ELECTRIC DEVICE, AND METHOD AND DEVICE FOR PREPARING BATTERY CELL

CROSS-REFERENCE TO RELATED APPLICATIONS

This application is a continuation of International Application PCT/CN2021/125917, filed on Oct. 22, 2021 and entitled "BATTERY, ELECTRIC DEVICE, AND METHOD AND DEVICE FOR PREPARING BATTERY CELL", which is incorporated herein by reference in its entirety.

TECHNICAL FIELD

This application relates to the field of battery technologies, and in particular, to a battery, an electric device, and a method and a device for preparing battery cell.

BACKGROUND

Energy conservation and emission reduction are crucial to sustainable development of the automobile industry. In this context, electric vehicles, with their advantages in energy conservation and environmental protection, have become an important part of sustainable development of the automobile industry. For electric vehicles, battery technology is an important factor in connection with their development.

To adapt to people's fast-paced travel needs, a battery needs to support fast charging during use. For this reason, it is necessary to increase the capacity of a battery cell, which may change the size of the battery cell and therefore requires a larger accommodating space. Therefore, how the space utilization of the battery cell is improved becomes a problem that needs to be resolved.

SUMMARY

This application provides a battery, an electric device, and a method and a device for preparing battery cell, so as to improve the space utilization of battery cells.

According to a first aspect, a battery is provided, including:
  a plurality of battery cells, where the plurality of battery cells are arranged in a first direction, a first region on an edge of a first surface of each of the plurality of battery cells is recessed to form a first recess, a first electrode terminal of each of the battery cells is protrusively provided on a second surface of the battery cell, the first surface and the second surface are perpendicular to the first direction, and the plurality of battery cells include a first battery cell and a second battery cell that are adjacent; and
  a first busbar, configured to connect a first electrode terminal of the first battery cell and a first electrode terminal of the second battery cell, where the first busbar bypasses a side wall of the second battery cell parallel to the first direction, so that a first end of the first busbar is connected to the first electrode terminal of the first battery cell and a second end of the first busbar is connected to the first electrode terminal of the second battery cell, where the first end of the first busbar and the first electrode terminal of the first battery cell are both accommodated in the first recess of the second battery cell.

In this technical solution, a first recess is provided on the edge of the first surface of each battery cell and the first electrode terminal of the battery cell is protrusively provided on the second surface opposite this first surface. Therefore, when the plurality of battery cells are arranged in a protruding direction of the first electrode terminal, the first recess of the second battery cell of two adjacent battery cells can accommodate the first electrode terminal of the first battery cell and the first busbar for connecting the two battery cells. The first busbar can bypass the side wall of the second battery cell, so that the first end of the first busbar is connected to the first electrode terminal of the first battery cell and the second end thereof is connected to the first electrode terminal of the second battery cell. The plurality of battery cells are arranged in the protruding direction of first electrode terminals thereof and the first electrode terminals are accommodated in the first recess of an adjacent battery cell. In this case, the first electrode terminals do not occupy extra space, thereby improving the space utilization of the battery cells.

In a possible embodiment, the first busbar includes the first end, the second end, and a bending portion disposed between the first end and the second end, where the bending portion is configured as bendable to allow the first busbar to bypass the side wall of the second battery cell parallel to the first direction.

In this embodiment, the bending portion is provided on the first busbar so that the first busbar can bypass a side wall of a battery cell more easily when the plurality of battery cells are being grouped, facilitating installation of the first busbar.

In a possible embodiment, the bending portion includes a first bending region, a second bending region, and an intermediate region, where the first bending region is configured for bending to connect the first end and the intermediate region, and the second bending region is configured for bending to connect the second end and the intermediate region.

In a possible embodiment, thickness of the first bending region and thickness of the second bending region are less than thickness of the intermediate region.

In this embodiment, the thickness of the first bending region and the thickness of the second bending region of the bending portion of the first busbar are less than the thickness of the intermediate region. In other words, the first bending region and the second bending region are thinned, facilitating bending of the first busbar.

In a possible embodiment, the intermediate region is perpendicular to the first surface and the second surface.

In this embodiment, the intermediate region of the bending portion of the first busbar is perpendicular to the first surface and the second surface of the battery cell. Therefore, the first busbar occupies the smallest space in a direction perpendicular to the first surface and the second surface, further improving the space utilization of the battery cells.

In a possible embodiment, the intermediate region is provided with a stiffener.

In this embodiment, the intermediate region of the bending portion of the first busbar is provided with a stiffener, thereby improving the strength of the first busbar.

In a possible embodiment, the stiffener is parallel to the first direction.

In a possible embodiment, a surface of the bending portion facing the second battery cell is provided with an insulation layer; or the bending portion is wrapped with an insulating material.

In this embodiment, the bending portion is provided with an insulation layer or wrapped with an insulating material, which can avoid electrical contact between the first busbar and the first electrode terminal of the battery cell and improve the safety of the battery.

In a possible embodiment, the insulation layer includes an insulation patch or insulation coating.

In a possible embodiment, in the first direction, size of the first recess is greater than the sum of height of the first electrode terminal and size of the first busbar.

In this embodiment, to make the first recess of a battery cell be able to accommodate first electrode terminals of other adjacent battery cells and the first busbar, the size of the first recess is greater than the sum of the height of the first electrode terminal and the size of the first busbar.

In a possible embodiment, in the first direction, a difference between size of the battery cell and the size of the first recess of the battery cell is greater than or equal to 2 mm.

In this embodiment, in the first direction in which the plurality of battery cells are arranged, the size of a position of the battery cell corresponding to the first recess is greater than or equal to 2 mm. In this case, components such as an adapting part, a plastic piece, and an electrode assembly inside the battery cell can be accommodated while requirements for the size of the first recess are satisfied.

In a possible embodiment, in a second direction, size of the first recess on the first surface is greater than or equal to 12 mm, where the second direction is perpendicular to a third surface of the battery cell, and the third surface is perpendicular to the first surface and the second surface.

In this embodiment, space needs to be reserved for positioning the first electrode terminal and an insulation edge cover thereof, a riveting block of battery cells, and a riveting tool. Therefore, in the second direction, the size of the first recess on the first surface should be set to be in a reasonable range, for example, greater than or equal to 12 mm.

In a possible embodiment, the battery cell includes a housing and an end cover, where the housing is configured to accommodate an electrode assembly of the battery cell, the end cover closes the housing to enclose the electrode assembly in the housing, a bottom wall of the housing forms the first surface of the battery cell, and the end cover forms the second surface of the battery cell.

In a possible embodiment, a region, corresponding to the electrode assembly, of the end cover is raised in a direction back away from the housing, so as to form a depression in a side of the end cover facing the housing.

In a possible embodiment, the depression is configured to limit a position of the electrode assembly during assembling of the electrode assembly.

In a possible embodiment, a contour line between the raised region of the end cover and the depression is used to define a welding track during welding of the housing and the end cover.

In this embodiment, in the battery cell, the region, corresponding to the electrode assembly, of the end cover is raised in the direction back away from the housing, so as to form a depression in the side of the end cover facing the housing. Such design not only enables the depression to limit the position of the electrode assembly during assembling of the electrode assembly, but also enables the contour line between the raised region of the end cover and the depression to define the welding track during welding of the housing and the end cover.

In a possible embodiment, depth of the depression is between 0.4 mm and 3 mm.

In this embodiment, the depression cannot be excessively deep so as to avoid affecting the position of the welding tool during the welding process, or excessively shallow so as to ensure proper implementation of the foregoing function. Therefore, the depth between 0.4 mm and 3 mm is optimal.

In a possible embodiment, distance between the contour line and the welding track is greater than 0.5 mm.

In a possible embodiment, in a cross section of a plane perpendicular to the first direction, the depression is greater than or equal to the electrode assembly in size.

In a possible embodiment, a second region on an edge of the first surface is recessed to form a second recess, the first region is located at a first end of the first surface in the second direction, and the second region is located at a second end of the first surface in the second direction. A second electrode terminal of each of the battery cells is protrusively provided on a second surface of the battery cell, and the second electrode terminal and the first electrode terminal are opposite in polarity, where the plurality of battery cells further includes a third battery cell adjacent to the second battery cell. The battery further includes a second busbar configured to connect a second electrode terminal of the second battery cell and a second electrode terminal of the third battery cell. The second busbar bypasses a side wall of the third battery cell parallel to the first direction, so that a first end of the second busbar is connected to the second electrode terminal of the second battery cell and a second end of the second busbar is connected to the second electrode terminal of the third battery cell, where the first end of the second busbar and the second electrode terminal of the second battery cell are both accommodated in the second recess of the third battery cell.

In this embodiment, the first region on the edge of the first surface of the battery cell is recessed to form the first recess, and each battery cell has the second recess and the second electrode terminal, where the second region on the edge of the first surface of the battery cell is recessed to form the second recess, and the second electrode terminal of the battery cell is protrusively provided on the second surface opposite this first surface. In this case, when the plurality of battery cells are arranged in the protruding direction of the second electrode terminal, the second recess of the third battery cell of two adjacent battery cells can accommodate the second electrode terminal of the second battery cell and the second busbar for connecting the two battery cells. The second busbar can bypass the side wall of the third battery cell, so that the first end of the second busbar is connected to the second electrode terminal of the second battery cell and the second end is connected to the second electrode terminal of the third battery cell. The plurality of battery cells are arranged in the protruding direction of second electrode terminals thereof and the second electrode terminals are accommodated in the second recess of adjacent battery cells. In this case, the second electrode terminals do not occupy extra space, thereby improving the space utilization of the battery cells.

According to a second aspect, an electric device is provided, including: the battery in the first aspect and any possible embodiment of the first aspect, where the battery is configured to supply electrical energy.

According to a third aspect, a method for preparing battery cell is provided. The method includes:
  providing a plurality of battery cells, where the plurality of battery cells are arranged in a first direction, a first region on an edge of a first surface of each of the plurality of battery cells is recessed to form a first recess, a first electrode terminal of each of the battery cells is protrusively provided on a second surface of the battery cell, the first surface and the second surface are perpendicular to the first direction, and the plurality of battery cells include a first battery cell and a second battery cell that are adjacent; and providing a first busbar, where the first busbar is configured to connect a first electrode terminal of the first battery cell and a first electrode terminal of the second battery cell, and the first busbar bypasses a side wall of the second battery cell parallel to the first direction, so that a first end of the first busbar is connected to the first electrode terminal of the first battery cell and a second end of the first busbar is connected to the first electrode terminal of the second battery cell, where the first end of the first busbar and the first electrode terminal of the first battery cell are both accommodated in the first recess of the second battery cell.

According to a fourth aspect, a device for preparing battery cell is provided. The device includes a provision module, where the provision module is configured to:

provide a plurality of battery cells, where the plurality of battery cells are arranged in a first direction, a first region on an edge of a first surface of each of the plurality of battery cells is recessed to form a first recess, a first electrode terminal of each of the battery cells is protrusively provided on a second surface of the battery cell, the first surface and the second surface are perpendicular to the first direction, and the plurality of battery cells include a first battery cell and a second battery cell that are adjacent; and provide a first busbar, where the first busbar is configured to connect a first electrode terminal of the first battery cell and a first electrode terminal of the second battery cell, and the first busbar bypasses a side wall of the second battery cell parallel to the first direction, so that a first end of the first busbar is connected to the first electrode terminal of the first battery cell and a second end of the first busbar is connected to the first electrode terminal of the second battery cell, where the first end of the first busbar and the first electrode terminal of the first battery cell are both accommodated in the first recess of the second battery cell.

BRIEF DESCRIPTION OF DRAWINGS

To describe the technical solutions in the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
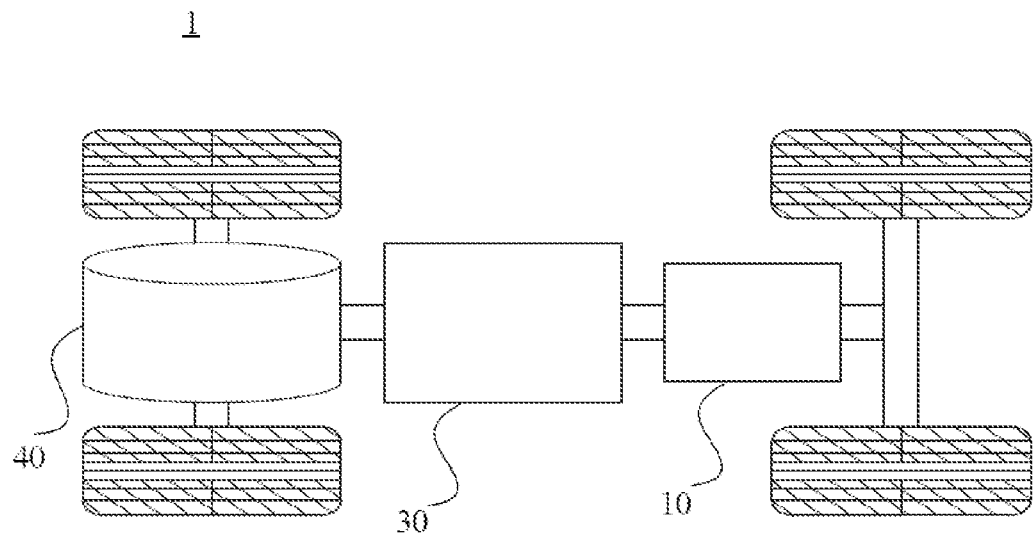
FIG. 1 is a schematic structural diagram of a vehicle according to an embodiment of this application.

The accompanying drawings are not drawn to scale.

DESCRIPTION OF EMBODIMENTS

The following further describes embodiments of this application in detail with reference to the accompanying drawings and embodiments. The following detailed description of embodiments and the accompanying drawings are intended to illustrate the principle of this application rather than to limit the scope of this application, meaning that this application is not limited to the embodiments as described.

In the descriptions of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that that the apparatuses or components must have specific orientations or must be constructed and manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations as shown in the drawings, and do not limit the specific structure of the application. In the description of this application, it should also be noted that unless otherwise specified and defined explicitly, the terms "mount", "connect", and "join" should be understood in their general senses. For example, they may refer to a fixed connection, a detachable connection, or an integrated connection, and may refer to a direct connection or an indirect connection via an intermediate medium. Persons of ordinary skill in the art can understand specific meanings of these terms in this application based on specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

Unless otherwise defined, all technical and scientific terms used in this application shall have the same meanings as commonly understood by those skilled in the art to which this application belongs. The terms used in the specification of this application are intended to merely describe the specific embodiments rather than to limit this application. The terms "include", "comprise", and any variations thereof in the specification and claims of this application as well as the foregoing description of the drawings are intended to cover non-exclusive inclusions. In the specification, claims, or accompanying drawings of this application, the terms "first", "second", and the like are intended to distinguish between different objects rather than to indicate a particular order or a relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment, or an independent or alternative embodiment that is exclusive of other embodiments. It is explicitly or implicitly understood by persons skilled in the art that the embodiments described herein may be combined with other embodiments.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

In this application, the battery is a single physical module that includes one or more battery cells for providing electric power. For example, the battery mentioned in this application may include a battery module, a battery pack, or the like. A battery typically includes a box configured to enclose one or more battery cells. The box can prevent liquids or other foreign matter from affecting charging or discharging of the battery cell.

Optionally, the battery cell may include a lithium ion secondary battery, a lithium ion primary battery, a lithium-sulfur battery, a sodium/lithium-ion battery, a sodium ion battery, a magnesium ion battery, or the like. This is not limited in the embodiments of this application. In some embodiments, the battery cell may also be referred to as a cell.

The battery cell includes an electrode assembly and an electrolyte, where the electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer protrudes out of a current collector coated with the positive electrode active substance layer, and the current collector uncoated with the positive electrode active substance layer is used as a positive tab. A lithium-ion battery is used as an example, for which the positive electrode current collector may be made of aluminum and the positive electrode active material may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. A current collector uncoated with the negative electrode active substance layer protrudes out of a current collector coated with the negative electrode active substance layer and serves as a negative tab. The negative electrode current collector may be made of copper, and a negative electrode active substance may be carbon, silicon, or the like. To allow a large current to pass through without any fusing, a plurality of positive tabs are provided and stacked together, and a plurality of negative tabs are provided and stacked together. The separator may be made of polypropylene (Polypropylene, PP), polyethylene (Polyethylene, PE), or the like. In addition, the electrode assembly may be a wound structure or a laminated structure, but the embodiments of this application are not limited thereto.

To meet different power requirements, a plurality of battery cells in a battery may be connected in series, parallel, or series-parallel, where being connected in series-parallel means a combination of series and parallel connections. Optionally, a plurality of battery cells may be connected in series, parallel, or series-parallel to form a battery module first, and then a plurality of battery modules are connected in series, parallel, or series-parallel to form a battery. In a word, the plurality of battery cells may be directly combined into a battery, or may first be combined into battery modules which are then combined into a battery. The battery is then disposed in an electric device to provide electrical energy for the electric device.

A signal transmission assembly may further be included in a box of the battery. The signal transmission assembly may be configured to transmit signals such as voltage and/or temperature of the battery cells. The signal transmission assembly may include a busbar, where the busbar is configured to implement an electrical connection between a plurality of battery cells, such as a parallel connection, a series connection, or a series-parallel connection. The busbar may implement the electrical connection between the battery cells by connecting electrode terminals of the battery cells. In some embodiments, the busbar may be fastened to the electrode terminals of the battery cells by welding. The busbar transmits voltage of the battery cells. A high voltage may be obtained after the plurality of battery cells are connected in series. Accordingly, the electrical connection formed by using the busbar may also be referred to as a "high-voltage connection".

In addition to the busbar, the signal transmission assembly may further include a sensor configured to sense a state of the battery cell. For example, the sensor may be configured to measure and transmit sensor signals such as temperature, state of charge, or the like of the battery cell. In embodiments of this application, electrically connected components within the battery may include the busbar and/or the sensor.

The busbar and the sensor may be packaged in an insulation layer to form the signal transmission assembly.

Accordingly, the signal transmission assembly may be configured to transmit voltage and/or sensor signals of the battery cell. No insulation layer is provided at a joint between the signal transmission assembly and the electrode terminal of the battery cell. In other words, the insulation layer is provided with an opening, so that a connection to the electrode terminal of the battery cell is established.

For the development of battery technologies, many design factors need to be considered, for example, performance parameters such as energy density, cycle life, discharge capacity, and charge and discharge rate. In addition, the space utilization of the battery cell also needs to be considered, so as to reduce the size of the battery and expand the application scenario of the battery.

In view of this, this application provides a technical solution: a recess is provided on the edge of a first surface of a battery cell, and electrode terminals of the battery cell are provided at corresponding positions on a second surface opposite the first surface. For the first battery cell and the second battery cell that are adjacent, the recess of the second battery cell can be used to accommodate the electrode terminals of the first battery cell, so that the electrode terminals do not occupy extra space. An electrical connection between two battery cells can be implemented so long as a busbar is provided to bypasses a side wall of the second battery cell, allowing two ends of the busbar to connect to electrode terminals of the first battery cell and the second battery cell.

The technical solutions described in the embodiments of this application are applicable to various apparatuses that use batteries, for example, mobile phones, portable devices, notebook computers, electric bicycle, electric toys, electric tools, electric vehicles, ships, and spacecrafts. For example, spacecrafts include airplanes, rockets, space shuttles, and spaceships.

It should be understood that the technical solutions described in the embodiments of this application are applicable to not only the apparatuses described above but also all apparatuses using batteries. However, for brevity of description, in the following embodiments, an electric vehicle is used as an example for description.

For example, as shown in FIG. 1 which is a schematic structural diagram of a vehicle 1 according to an embodiment of this application, the vehicle 1 may be a fossil fuel vehicle, a natural-gas vehicle, or a new energy vehicle, where the new energy vehicle may be a battery electric vehicle, a hybrid electric vehicle, a range-extended vehicle, or the like. A motor 40, a controller 30, and a battery 10 may be provided inside the vehicle 1, where the controller 30 is configured to control the battery 10 to supply power to the motor 40. For example, the battery 10 may be disposed at the bottom, front, or rear of the vehicle 1. The battery 10 may be configured to supply power to the vehicle 1. For example, the battery 10 may be used as an operational power source for the vehicle 1 which is configured for a circuit system of the vehicle 1, for example, to satisfy power needs of start, navigation, and running of the vehicle 1. In another embodiment of this application, the battery 10 can be used not only as the operational power source for the vehicle 1, but also as a driving power source for the vehicle 1, replacing or partially replacing fossil fuel or natural gas to provide driving traction for the vehicle 1.

Figure 2:
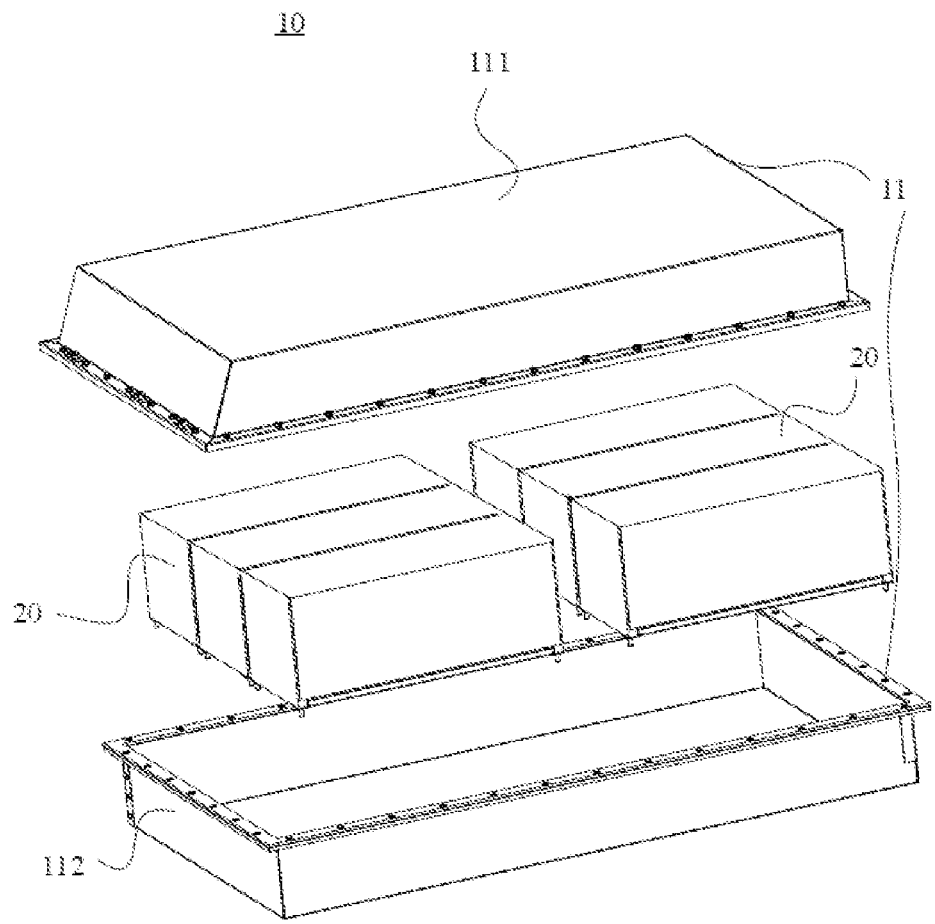
FIG. 2 is a schematic structural diagram of a battery according to an embodiment of this application.

The battery 10 may include a plurality of battery cells. For example, as shown in FIG. 2 which is a schematic structural diagram of a battery 10 according to an embodiment of this application, the battery 10 may include at least one battery module 200. The battery module 200 includes a plurality of battery cells 20. The battery 10 may further include a box 11. Inside the box 11 is a hollow structure. The plurality of battery cells 20 are accommodated in the box 11. As shown in FIG. 2, the box 11 may include two portions, which are herein referred to as a first portion 111 (upper box body) and a second portion 112 (lower box body), and the first portion 111 and the second portion 112 are snap-fitted together. Shapes of the first portion 111 and the second portion 112 may be determined based on a shape of the combination of the battery cells 20. At least one of the first portion 111 and the second portion 112 is provided with an opening. For example, as shown in FIG. 2, the first portion 111 and the second portion 112 each may be a hollow cuboid and have only one face with an opening, where an opening of the first portion 111 and an opening of the second portion 112 are opposite each other, and the first portion 111 and the second portion 112 are snap-fitted to form a box 11 having an enclosed chamber. For another example, unlike FIG. 2, it is possible that only one of the first portion 111 and the second portion 112 is a hollow cuboid with an opening, and the other may be a plate for covering the opening. For example, an example is used where the second portion 112 is a hollow cuboid and has only one face with an opening and the first portion 111 is a plate. Therefore, the first portion 111 covers the opening of the second portion 112 to form the box with an enclosed chamber. The chamber may be configured to accommodate the plurality of battery cells 20. The plurality of battery cells 20 are connected in parallel, series, or series-parallel, and then placed into the box 11 formed after the first portion 111 and the second portion 112 that are snap-fitted.

Optionally, the battery 10 may further include other structures. Details are not described herein. For example, the battery 10 may further include a busbar, where the busbar is configured to implement an electrical connection between a plurality of battery cells 20, for example, a parallel connection, a series connection, or a series-parallel connection. Specifically, the busbar may implement the electrical connection between the battery cells 20 by connecting electrode terminals of the battery cells 20. Further, the busbar may be fastened to the electrode terminal of the battery cell 20 by welding. Electrical energy of the plurality of battery cells 20 can be further drawn out of the box through a conductive mechanism. Optionally, the conductive mechanism may also belong to the busbar.

Based on different power demands, battery cells 20 can be provided in any quantity. The plurality of battery cells 20 may be connected in series, parallel, or series-parallel to achieve greater capacity or power. Because each battery 10 may include a large quantity of battery cells 20, for ease of installation, the battery cells 20 may be arranged in groups, and each group of battery cells 20 forms a battery module. The quantity of battery cells 20 included in the battery module is not limited, and may be set based on requirements. A battery may include a plurality of battery modules. These battery modules may be connected in series, parallel, or series-parallel.

Figure 3:
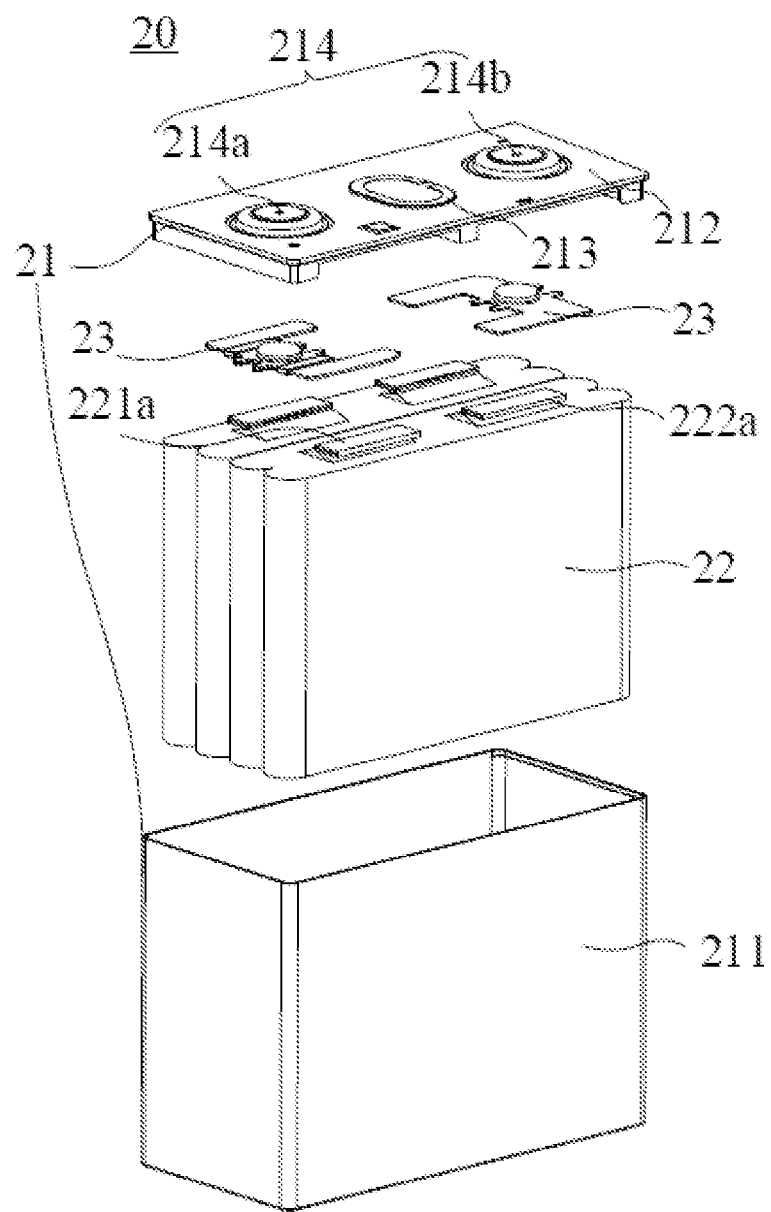
FIG. 3 is a schematic structural diagram of a battery cell according to an embodiment of this application.

For example, as shown in FIG. 3 which is a schematic structural diagram of a battery cell 20 according to an embodiment of this application, the battery cell 20 includes one or more electrode assemblies 22, a housing 211, and an end cover 212. The housing 211 and the end cover 212 form a shell or a battery box 21. Walls of the housing 211 and the end cover 212 are referred to as walls of the battery cell 20, where for a cuboid battery cell 20, the walls of the housing 211 include a bottom wall and four side walls. The housing 211 is determined depending on a shape in which one or more combined electrode assemblies 22 are combined. For example, the housing 211 may be a hollow cuboid, cube, or cylinder, and one face of the housing 211 has an opening for placing the one or more electrode assemblies 22 into the housing 211. For example, when the housing 211 is a hollow cuboid or cube, one face of the housing 211 is an opening face, which means that the face has no wall so that the inside and the outside of the housing 211 are communicated. When the housing 211 is a hollow cylinder, the end face of the housing 211 is an opening face, which means that the end face has no wall so that the inside and the outside of the housing 211 are communicated. The end cover 212 covers the opening and is connected to the housing 211 so as to form an enclosed chamber for accommodating the electrode assembly 22. The housing 211 is filled with an electrolyte such as a liquid electrolyte.

The battery cell 20 may further include two electrode terminals 214 that may be disposed on the end cover 212. The end cover 212 is typically flat, and the two electrode terminals 214 are fixed on a flat surface of the end cover 212. The two electrode terminals 214 are a positive electrode terminal 214a and a negative electrode terminal 214b, respectively. Each electrode terminal 214 is correspondingly provided with a connecting member 23 or a current collecting member 23, which is located between the end cover 212 and the electrode assembly 22 to electrically connect the electrode assembly 22 and the electrode terminal 214.

As shown in FIG. 3, each electrode assembly 22 has a first tab 221a and a second tab 222a. The first tab 221a and the second tab 222a have opposite polarities. For example, when the first tab 221a is a positive tab, the second tab 222a is a negative tab. The first tabs 221a of the one or more electrode assemblies 22 are connected to one electrode terminal through one connecting member 23, and the second tabs 222a of the one or more electrode assemblies 22 are connected to the other electrode terminal through the other connecting member 23. For example, the positive electrode terminal 214a is connected to the positive tab through one connecting member 23, and the negative electrode terminal 214b is connected to the negative tab through the other connecting member 23.

In the battery cell 20, one or more electrode assemblies 22 may be provided depending on actual needs. As shown in FIG. 3, the battery cell 20 is provided with four independent electrode assemblies 22.

A pressure relief mechanism 213 may further be provided on the battery cell 20. The pressure relief mechanism 213 is configured to be actuated to relieve internal pressure or temperature when the internal pressure or temperature of the battery cell 20 reaches a threshold.

Optionally, the pressure relief mechanism 213 may be various possible pressure relief structures, which is not limited in the embodiments of this application. For example, the pressure relief mechanism 213 may be a temperature-sensitive pressure relief mechanism, where the temperature-sensitive pressure relief mechanism is configured to be melted when the internal temperature of the battery cell 20 provided with the pressure relief mechanism 213 reaches a threshold; and/or the pressure relief mechanism 213 may be a pressure-sensitive pressure relief mechanism, where the pressure-sensitive pressure relief mechanism is configured to be split when the internal pressure of the battery cell 20 provided with the pressure relief mechanism 213 reaches a threshold.

It should be understood that the plurality of battery cells 20 included in the battery 10 according to an embodiment of this application may be arranged in any direction within the box 11. For example, as shown in FIG. 3, the battery cell 20 is in a cuboid shape. As shown in FIG. 2, a plurality of battery cells 20 may be installed in the box in a vertical direction shown in FIG. 3 so that the end covers 212 of the plurality of battery cells 20 after installation face an upper box body 211, and bottom walls of the housing 211 of the battery cells 20 face a lower box body 212. For another example, unlike FIG. 2, the plurality of battery cells 20 shown in FIG. 3 may alternatively be arranged laterally in the box.

During grouping of the square battery cells 20 shown in FIG. 3, when subjected to external force such as impact, the battery cells 20 tend to be staggered with each other. In this case, the electrode terminals 214 of the battery cells 20 are tugged by the busbar and side walls of the battery cells 20 have a large area, which easily causes deformation. For this reason, the battery cell 20 may be set as a blade shape. That is, length of the battery cell is increased so that the housing 211 of the battery cell 20 can support to a certain extent and share part of the force. In addition, the electrode terminals 214 are provided at the end of the battery cells 20 in a length direction, so as to reduce the tugging force between the electrode terminals 214 of the battery cells applied by the busbar.

In a case that the battery cell 20 has specified energy density, if size of the battery cell 20 in the length direction is increased, size in a thickness direction needs to be reduced, and the battery cell 20 is further flattened. This avoids overlarge current at the electrode terminal caused by an excessively large capacity of the battery cell 20, and therefore prevents heat generated at the electrode terminal from exceeding the applicable temperature of the battery cell 20. The thickness of the battery cell 20 is reduced. When the electrode terminal 214 is provided at the end of the battery cell 20, size of the electrode terminal 214 is limited. If the size of the electrode terminal 214 is excessively small, over-current requirements cannot be satisfied.

Figure 4:
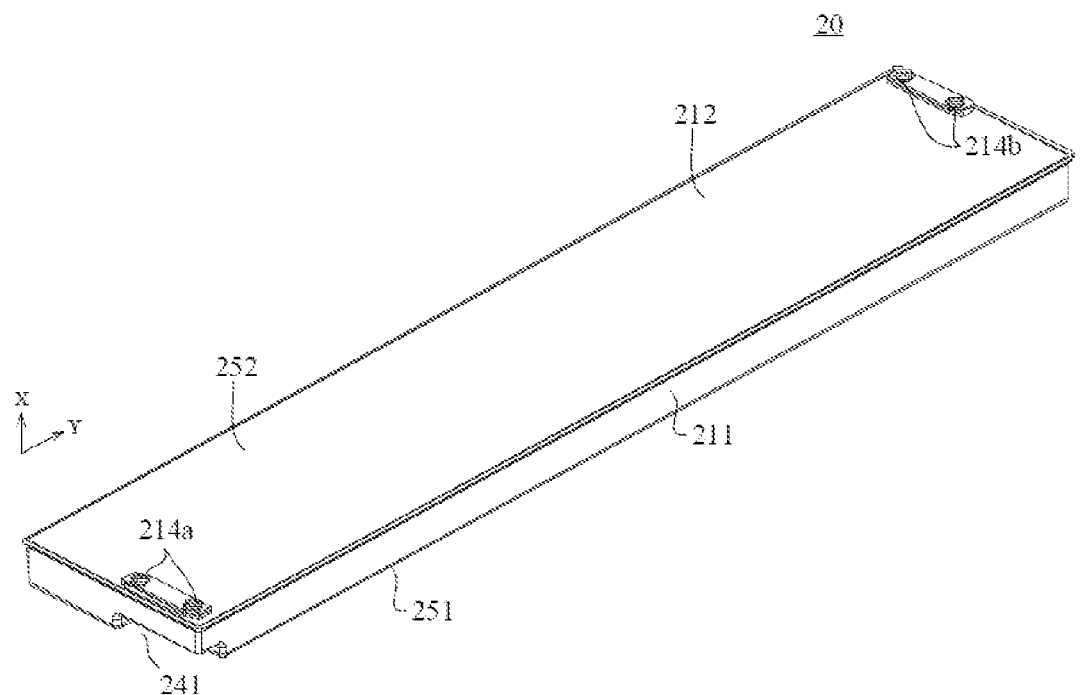
FIG. 4 is a schematic structural diagram of a battery cell according to an embodiment of this application.

For this reason, a blade-shaped battery cell 20 as shown in FIG. 4 may be used in an embodiment of this application. As shown in FIG. 4, the battery cell 20 includes a first surface 251, a second surface 252, and a first electrode terminal 214a. A first region on an edge of the first surface 251 is recessed to form a first recess 241, and the first electrode terminal 214a of the battery cell 20 is provided on the second surface 252, where the first surface 251 and the second surface 252 are perpendicular to a first direction X. In the first direction X, the first electrode terminal 214a is protrusively provided on the second surface 252 of the battery cell 20 and is opposite to the first recess 241. In FIG. 4, positions of the positive electrode terminal 214a and a negative electrode terminal 214b can be exchanged. The following description is based on an example, in which the electrode terminal in a position corresponding to the first recess 241 is the positive electrode terminal 214a.

The first surface 251 may be a bottom wall of the housing 211 of the battery cell 20, and the first region of the first surface 251 is located at one edge of the battery cell 20 in the X direction. The second surface 252 may be a surface of the end cover 212 of the battery cell. Optionally, depth of the first recess 241 in the first direction X is greater than height of the electrode terminal, and a projection area of the first recess 241 on the first surface 251 is larger than a projection area of the first electrode terminal 214a on the first surface 251. In this way, the first recess 241 can accommodate first electrode terminals 214a of other battery cells 20 provided adjacent to the battery cell 20 in the first direction.

Figure 5:
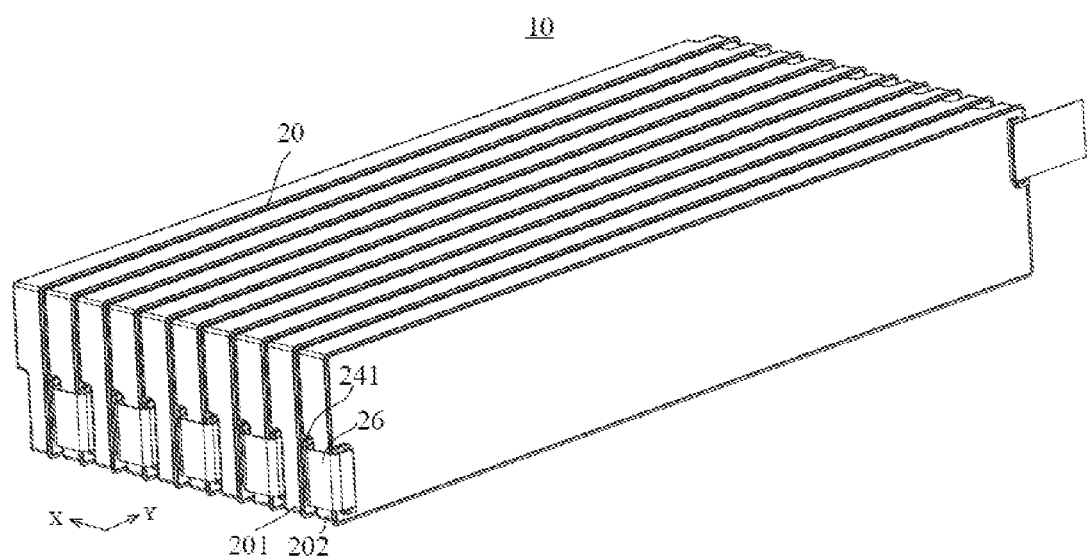
FIG. 5 is a schematic structural diagram of a battery according to an embodiment of this application.

Specifically, FIG. 5 is a side view of a battery 10 according to an embodiment of this application. The battery 10 includes a plurality of battery cells 20, for example, a first battery cell 201 and a second battery cell 202 that are adjacent. The plurality of battery cells 20 are arranged in the first direction X. For each of the plurality of battery cells 20, the first region on the edge of the first surface 251 is recessed to form the first recess 241. The first electrode terminal 214a of each battery cell 20 is protrusively provided on the second surface 252 of the battery cell 20. A protruding direction of the first electrode terminal 214a is the first direction X.

Figure 6:
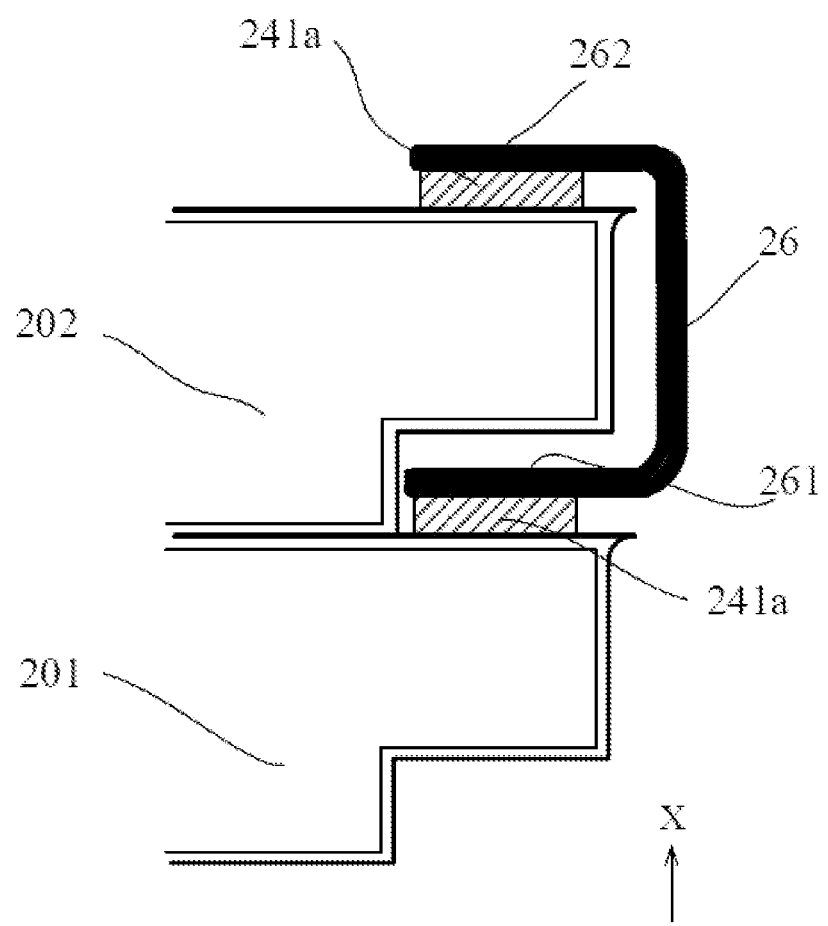
FIG. 6 is a schematic diagram of connecting adjacent battery cells through a busbar according to an embodiment of this application.

The battery 10 further includes a first busbar 26. The first busbar 26 is configured to electrically connect the first electrode terminals 214a of two adjacent battery cells 20. For example, the first busbar 26 between the first battery cell 201 and the second battery cell 202 is configured to electrically connect the first electrode terminal 214a of the first battery cell 201 and the first electrode terminal 214a of the second battery cell 202. As shown in FIG. 6, the first busbar 26 bypasses a side wall of the second battery cell 202 parallel to the first direction X, so that a first end 261 of the first busbar 26 is connected to the first electrode terminal 214a of the first battery cell 201 and a second end 262 of the first busbar 26 is connected to the first electrode terminal 214a of the second battery cell 202, where the first end 261 of the first busbar 26 and the first electrode terminal 214a of the first battery cell 201 are both accommodated in the first recess 241 of the second battery cell 202.

The first recess 241 is provided on the edge of the first surface 251 of each battery cell 20 and the first electrode terminal 214a of the battery cell 20 is protrusively provided on the second surface 252 opposite the first surface 251. Therefore, when a plurality of battery cells 20 are arranged in the protruding direction of the first electrode terminal 214a, the first recess 241 of the second battery cell 202 of two adjacent battery cells can accommodate the first electrode terminal 214a of the first battery cell 201 and the first busbar 26 for connecting the two battery cells 20. The first busbar 26 can bypass the side wall of the second battery cell 202, so that the first end 261 of the first busbar 26 is connected to the first electrode terminal 214a of the first battery cell 201 and the second end 262 is connected to the first electrode terminal 214a of the second battery cell 202. The plurality of battery cells 20 are arranged in the protruding direction X of the first electrode terminals 214a thereof, and the first electrode terminals 214a are accommodated in the first recesses 241 of the adjacent battery cells 20 and do not occupy the module assembly space. Therefore, space utilization of the battery cells 20 is increased.

Figure 7:
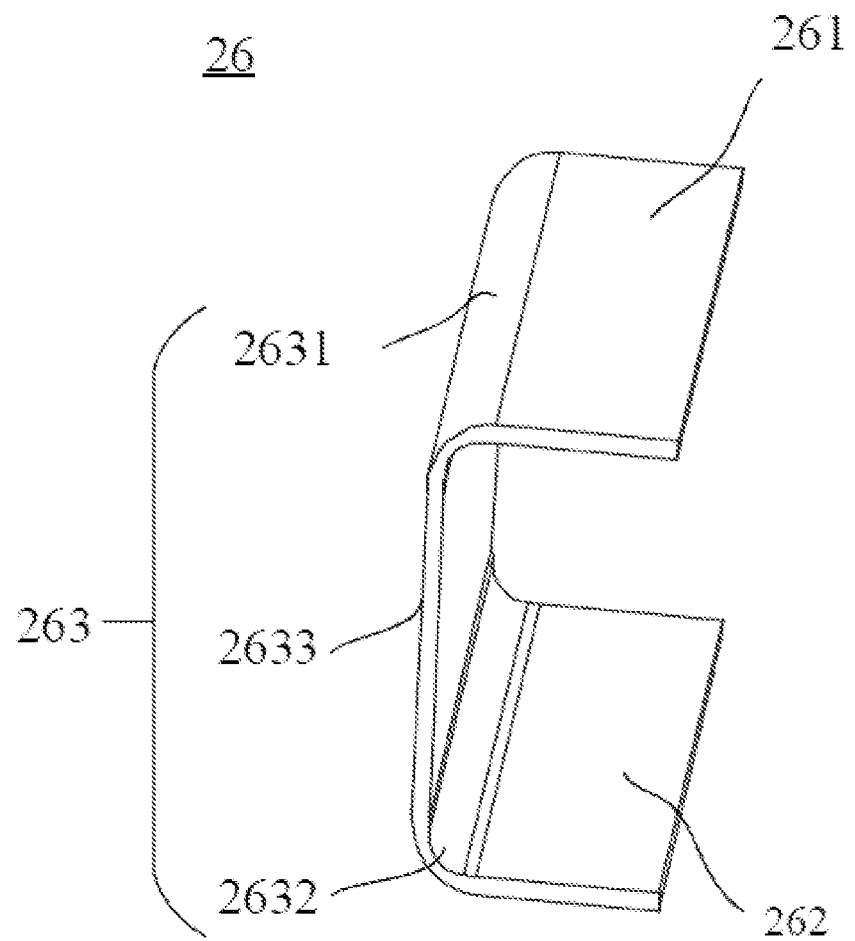
FIG. 7 is a schematic structural diagram of a busbar according to an embodiment of this application.

In an embodiment, as shown in FIG. 7, the first busbar 26 includes a first end 261, a second end 262, and a bending portion 263 disposed between the first end 261 and the second end 262. Where, the bending portion 263 is configured as bendable to allow the first busbar 26 to bypass the side wall of the second battery cell 202 parallel to the first direction X.

In this case, the bending portion 263 is provided on the first busbar 26 so that the first busbar 26 can bypass the side wall of the battery cell 20 more easily when the plurality of battery cells 20 are being grouped, facilitating installation of the first busbar 26.

In an embodiment, as shown in FIG. 7, the bending portion 263 includes a first bending region 2631, a second bending region 2632, and an intermediate region 2633, where the first bending region 2631 is configured for bending to connect the first end 261 and the intermediate region 2633, and the second bending region 2632 is configured for bending to connect the second end 262 and the intermediate region 2633.

In an embodiment, as shown in FIG. 7, thickness of the first bending region 2631 and thickness of the second bending region 2632 are less than thickness of the intermediate region 2633. In this way, the thickness of the first bending region 2631 and the thickness of the second bending region 2632 of the bending portion 263 of the first busbar 26 are less than the thickness of the intermediate region 2633. In other words, the first bending region 2631 and the second bending region 2632 are thinned, facilitating bending of the first busbar 26.

In an embodiment, the intermediate region 2633 is perpendicular to the first surface 251 and the second surface 252 of the battery cell 20. The intermediate region of the bending portion of the first busbar 26 is perpendicular to the first surface 251 and the second surface 252 of the battery cell 20. Therefore, the first busbar 26 occupies the smallest space in a direction perpendicular to the first surface 251 and the second surface 252, further improving the space utilization of the battery cells.

Figure 8:
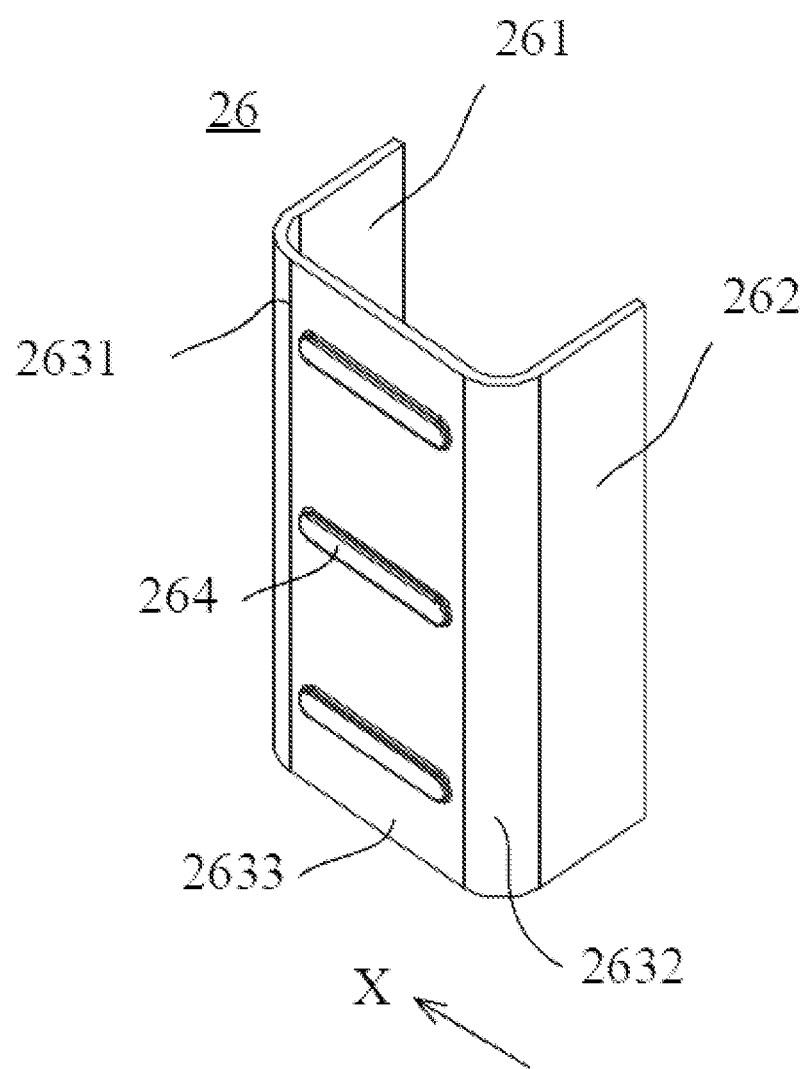
FIG. 8 is a schematic structural diagram of a busbar according to an embodiment of this application.

Further, as shown in FIG. 8, the intermediate region 2633 may be provided with a stiffener 264, so as to improve the strength of the first busbar 26. For example, the stiffener 264 may be parallel to the first direction X.

Figure 9:
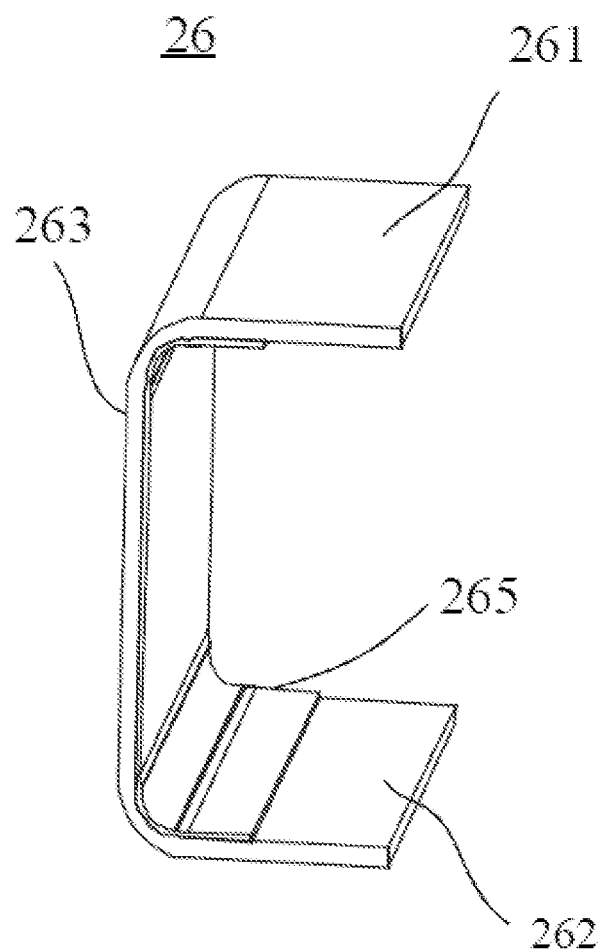
FIG. 9 is a schematic structural diagram of a busbar according to an embodiment of this application.
Figure 10:
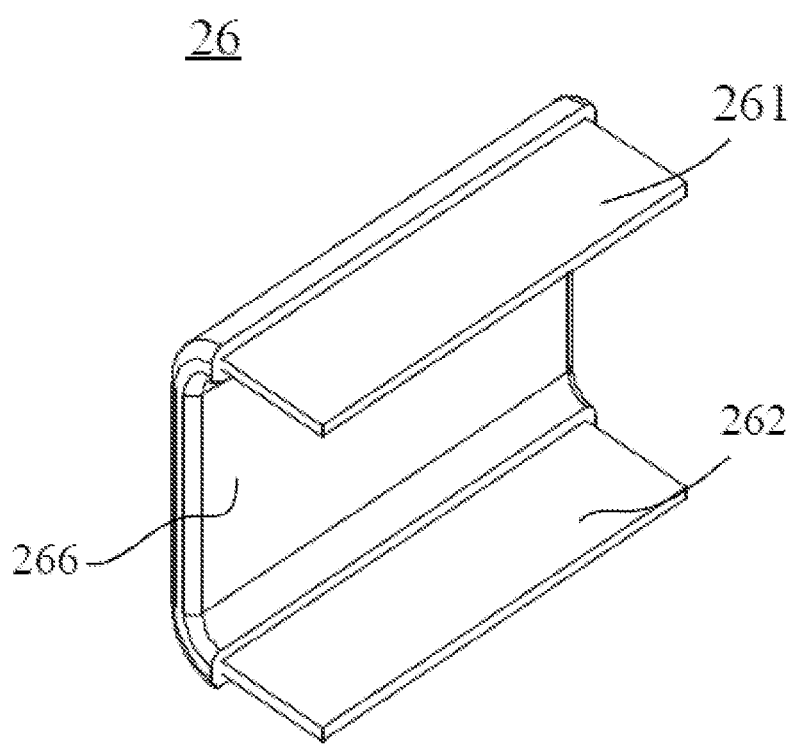
FIG. 10 is a schematic structural diagram of a busbar according to an embodiment of this application.

In an embodiment, as shown in FIG. 9, a surface of the bending portion 263 facing the battery cell 20 is provided with an insulation layer 265. The insulation layer may be, for example, an insulation patch or insulation coating. Alternatively, in another embodiment, as shown in FIG. 10, the bending portion 263 is wrapped with an insulating material 266. The bending portion 263 is provided with the insulation layer 265 or wrapped with the insulating material 266, which can avoid electrical contact between the first busbar 26 and the first electrode terminal 214a of the battery cell 20 can be avoided and improve the safety of the battery 10.

Figure 11:
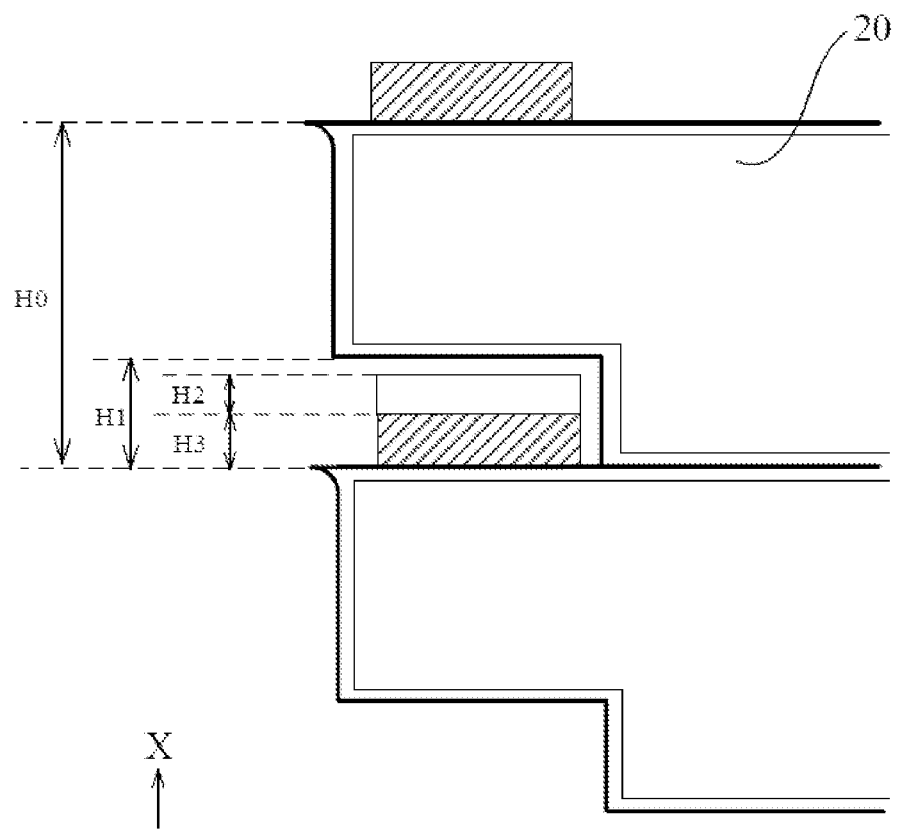
FIG. 11 is a schematic diagram of dimensions of a busbar according to an embodiment of this application.

In an embodiment, as shown in FIG. 11, in the first direction X, size H1 of the first recess 241 is greater than the sum of height H3 of the first electrode terminal 214a and size H2 of the first busbar 26, so that the first recess 241 of the battery cell 20 can accommodate the first electrode terminals 214a of other adjacent battery cells 20 and the first busbar 26.

For example, in the first direction X, a difference between size H0 of the battery cell 20 (excluding the height H3 of the first electrode terminal 214a) and the size H2 of the first recess 241 of the battery cell 20 may be greater than or equal to 2 mm, that is, H0−H1>2 mm. In this way, in the first direction X, when the size of a position of the battery cell 20 corresponding to the first recess 241 is greater than or equal to 2 mm, components such as an adapting part, a plastic piece, and an electrode assembly 22 inside the battery cell 20 can be accommodated while requirements for the size of the first recess 241 are satisfied.

Figure 12:
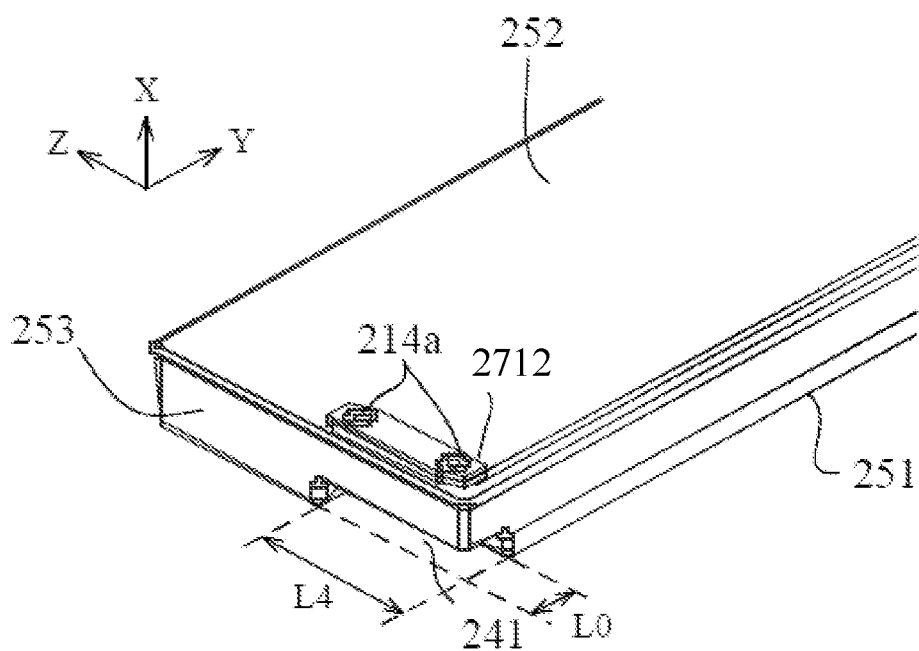
FIG. 12 is a schematic diagram of dimensions of a busbar according to an embodiment of this application.

For another example, as shown in FIG. 12, in a second direction Y, size L0 of the first recess 241 on the first surface 251 is greater than or equal to 12 mm, where the second direction Y is perpendicular to a third surface 253 of the battery cell 20, and the third surface 253 is perpendicular to the first surface 251 and the second surface 252.

In the second direction Y, space needs to be reserved for positioning the first electrode terminal 214a and an insulation edge cover thereof, a riveting block 2712 of battery cells 20, and a riveting tool. Therefore, in the second direction Y, the size of the first recess 241 of the battery cell 20 on the first surface 251 should be set to be in a reasonable range, for example, greater than or equal to 12 mm. Typically, a diameter D of the first electrode terminal 214a satisfies D≥5 mm so as to ensure the over-current requirement of the first electrode terminal 214a. A one-sided size of the riveting block 2712 in the second direction Y may be set, for example, as L1≥2–3 mm, one-sided thickness of the insulation edge cover for wrapping the first electrode terminal 214a may be set, for example, as L2≥0.6 mm, and a one-sided clearance of a riveting jig during positioning may be set, for example, as L3≥1 mm. Therefore, the size L0 of the first recess 241 in the second direction Y typically needs to be greater than 5+(2+0.6+1)*2=12.2 mm.

For another example, as shown in FIG. 12, in a third direction Z, size L4 of the first recess 241 on the first surface 251 is greater than or equal to 15 mm, so as to meet requirements such as a spacing between two first electrode terminals 214a and the thickness of the insulation edge cover of each first electrode terminal 214a.

Figure 13:
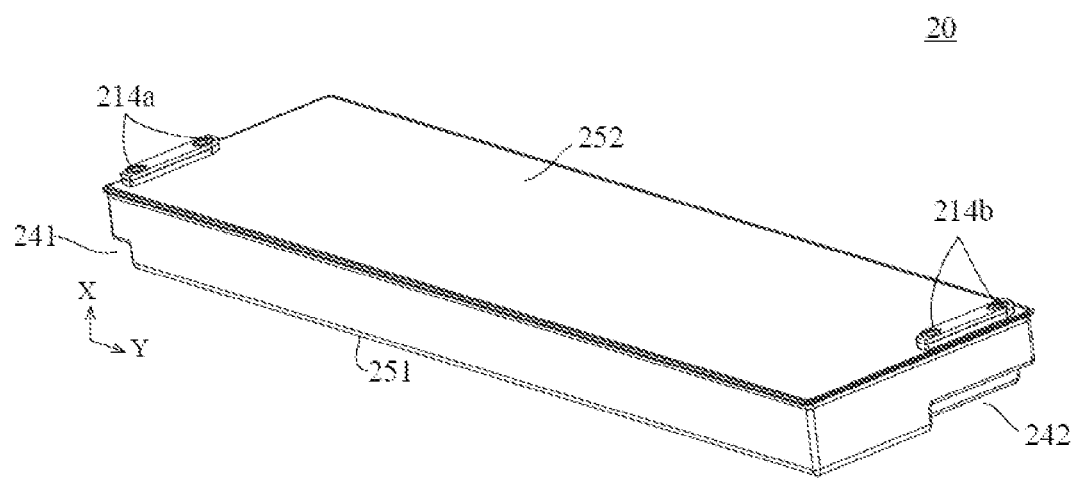
FIG. 13 is a schematic structural diagram of a battery cell according to an embodiment of this application.

In an embodiment, as shown in FIG. 13, a second region on the edge of the first surface 251 of each battery cell 20 is recessed to form a second recess 242, where the first region is located at a first end of the first surface 251 in the second direction Y and the second region is located at a second end of the first surface 251 in the second direction Y. The second electrode terminal 214b of each battery cell 20 is protrusively provided on the second surface 252 of the battery cell 20, and the second electrode terminal 214b and the first electrode terminal 214a are opposite in polarity. In FIG. 13, positions of the positive electrode terminal 214a and the negative electrode terminal 214b can be exchanged. The following description is based on an example, in which the electrode terminal in a position corresponding to the second recess 242 is the negative electrode terminal 214b.

Figure 14:
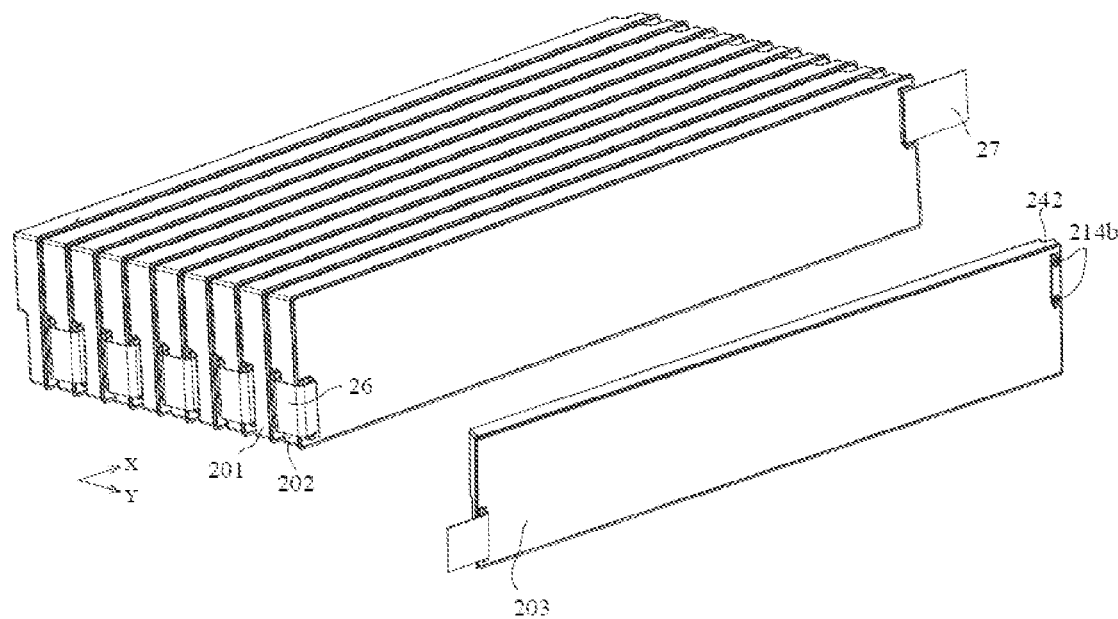
FIG. 14 is a schematic diagram of a grouping process of battery cells according to an embodiment of this application.

As shown in FIG. 14, the plurality of battery cells 20 further include a third battery cell 203 adjacent to the second battery cell 202. The battery 10 further includes a second busbar 27, where the second busbar 27 is configured to connect a second electrode terminal 214b of the second battery cell 202 and a second electrode terminal 214b of the third battery cell 203. Similarly, the second busbar 27 eventually bypasses a side wall of the third battery cell 203 parallel to the first direction X, so that a first end of the second busbar 27 is connected to the second electrode terminal 214b of the second battery cell 202 and a second end of the second busbar 27 is connected to the second electrode terminal 214b of the third battery cell 203. The first end of the second busbar 27 connected to the second battery cell 202 and the second electrode terminal 214b of the second battery cell 202 are both accommodated in the second recess 242 of the third battery cell 203.

It should be understood that for specific details of the second recess 242 and the second busbar 27, reference may be made to the related descriptions of the first recess 241 and the first busbar 26. For brevity, details are not described herein. The first electrode terminal is provided in a position, corresponding to the first recess 241, on the second surface 252 of the battery cell 20; and the second electrode terminal is provided in a position, corresponding to the second recess 242, on the second surface 252 of the battery cell 20. The first electrode terminal and the second electrode terminal may be a positive electrode terminal 214a and a negative electrode terminal 214b respectively, or the first electrode terminal and the second electrode terminal may be a negative electrode terminal 214b and a positive electrode terminal 214a respectively.

The following describes the process of grouping a plurality of battery cells 20 is described by using an example in which the first electrode terminals 214a of the first battery cell 201 and the second battery cell 202 are connected. After the first battery cell 201 is disposed, the first end 261 of the first busbar 26 is welded to the first electrode terminal 214a in the corresponding position on the second surface 252 of the first battery cell 201. Then, the second surface 252 of the second battery cell 202 is stacked towards the first surface of the first battery cell 201, and the first electrode terminal 214a of the first battery cell 201 is accommodated in the first recess 241 of the second battery cell 202. Next, the first busbar 26 is bent to bypass the side wall of the second battery cell 202 parallel to the first direction X, and the second end 262 of the first busbar 26 is welded to the first electrode terminal 214a of the second battery cell 202. In this way, the electrical connection between the first electrode terminals 214a of the first battery cell 201 and the second battery cell 202 is completed. Similarly, an electrical connection between the second electrode terminals 214b of the second battery cell 202 and the third battery cell 203 that are adjacent can also be implemented. The plurality of battery cells 20 are grouped in a similar manner to form the battery 10.

Figure 15:
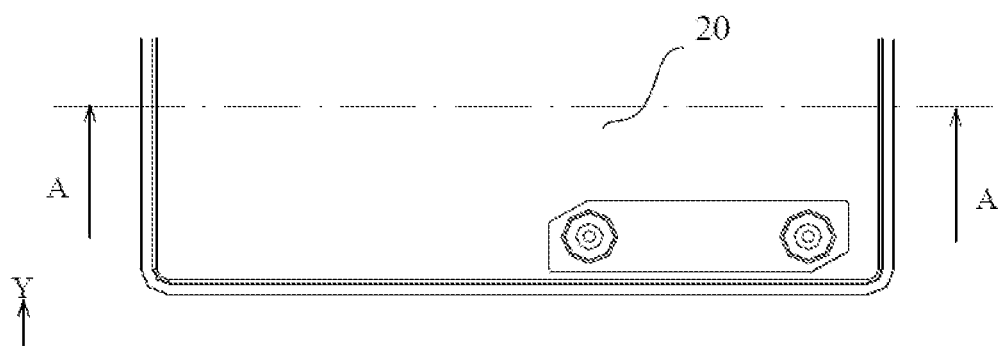
FIG. 15 is a side view of a battery cell according to an embodiment of this application.
Figure 16:
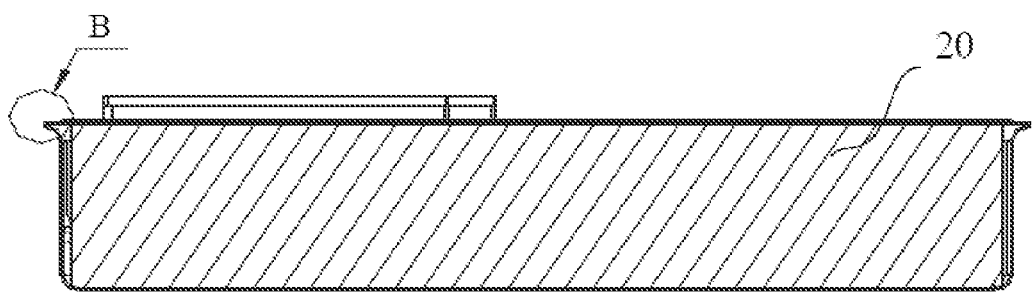
FIG. 16 is a side view of a battery cell according to an embodiment of this application.
Figure 17:
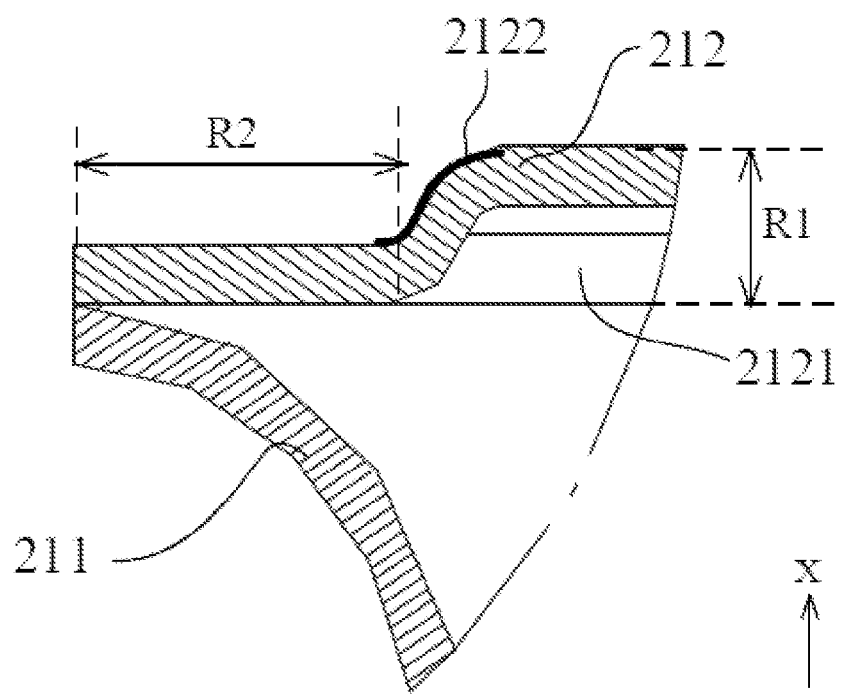
FIG. 17 is a schematic structural diagram of a depression in an end cover of a battery cell according to an embodiment of this application.

In an embodiment, referring to FIG. 15 to FIG. 17, FIG. 16 is a cross-sectional view of the battery cell shown in FIG. 15 in direction A-A, namely, the second direction Y, and FIG. 17 is a partially enlarged view of region B as shown in FIG. 16. The region, corresponding to the electrode assembly 22, of the end cover 212 of the battery cell 20 is raised in a direction back away from the housing 211 to form a depression 2121 in the side of the end cover 212 facing the housing 211.

The depression 2121 can limit the position of the electrode assembly 22 during assembling of the electrode assembly 22. Further, a contour line 2122 between the raised region of the end cover 212 and the depression 2121 is used to define a welding track during welding of the housing 211 and the end cover 212.

Optionally, in a cross section of a plane perpendicular to the first direction X, the depression 2121 is greater than or equal to the electrode assembly 22 in size, so that the electrode assembly 22 can be accommodated in the depression 2121.

As shown in FIG. 17, depth R1 of the depression 2121 in the first direction X is, for example, between 0.4 mm and 3 mm. The depression 2121 cannot be excessively deep so as to avoid affecting the position of the welding tool during the welding process, or excessively shallow so as to ensure proper implementation of the foregoing function. Therefore, the depth between 0.4 mm and 3 mm is optimal.

As shown in FIG. 16, distance R2 between the contour line 2122 and the welding track may be, for example, greater than 0.5 mm, so as to reserve a position for the welding tool during the welding process. In this case, a laser welding lens can be located properly.

It can be seen that in the battery cell 20, the region of the end cover 212 corresponding to the electrode assembly 22 is raised in the direction back away from the housing 211 to form the depression 2121 in the side of the end cover 212 facing the housing 211. Such design not only enables the depression 2121 to limit the position of the electrode assembly 22 during assembling of the electrode assembly 22, but also enables the contour line 2122 between the raised region of the end cover 212 and the depression 2121 to define the welding track during welding of the housing 211 and the end cover 212.

An embodiment of this application further provides an electric device. The electric device may include the battery 10 in the preceding embodiments and the battery 10 is configured to supply electrical energy to the electric device. Optionally, the electric device may be a vehicle, a ship, or a spacecraft.

The battery 10 of the preceding embodiments is provided in the electric device, and the electrode terminals of the battery cells 20 of the battery 10 are accommodated in the recesses of adjacent battery cells. Therefore, the space is saved and the space utilization is improved, facilitating the popularization and application of the electric device.

The battery and the electric device in the embodiments of this application have been described above, and a method and a device for preparing battery in the embodiments of this application are described below. For those not described in detail, refer to the foregoing embodiments.

Figure 18:
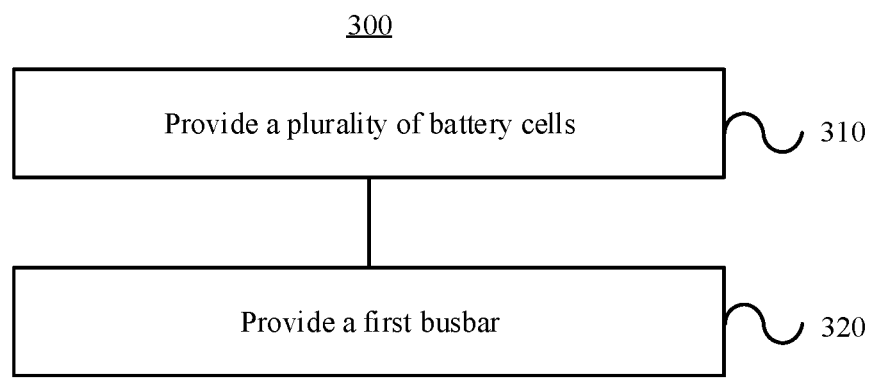
FIG. 18 is a schematic flowchart of a method for preparing battery according to an embodiment of this application.

FIG. 18 is a schematic flowchart of a method 300 for preparing battery according to an embodiment of this application. As shown in FIG. 18, the method 300 may include the following steps.

Step 310: Provide a plurality of battery cells 20, where the plurality of battery cells 20 are arranged in a first direction X, a first region on an edge of a first surface 251 of each of the plurality of battery cells 20 is recessed to form a first recess 241, a first electrode terminal 214a of each of the battery cells 20 is protrusively provided on a second surface 252 of the battery cell 20, the first surface 251 and the second surface 252 are perpendicular to the first direction X, and the plurality of battery cells 20 include a first battery cell 201 and a second battery cell 202 that are adjacent. Step 320: Provide a first busbar 26, where the first busbar 26 is configured to connect a first electrode terminal 214a of the first battery cell 201 and a first electrode terminal 214a of the second battery cell 202, and the first busbar 26 bypasses a side wall of the second battery cell 202 parallel to the first direction X, so that a first end 261 of the first busbar 26 is connected to the first electrode terminal 214a of the first battery cell 201 and a second end 262 of the first busbar 26 is connected to the first electrode terminal 214a of the second battery cell 202, where the first end 261 of the first busbar 26 and the first electrode terminal 214a of the first battery cell 201 are both accommodated in the first recess 241 of the second battery cell 202.

Figure 19:
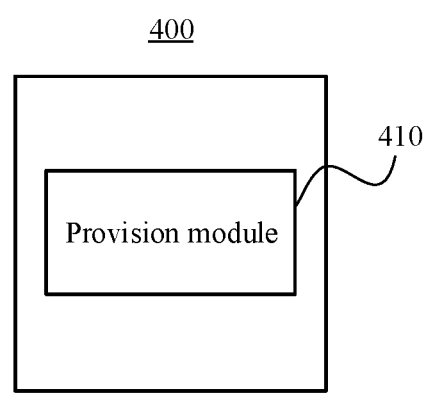
FIG. 19 is a schematic block diagram of a device for preparing battery according to an embodiment of this application.

FIG. 19 is a schematic block diagram of a device 400 for preparing battery according to an embodiment of this application. As shown in FIG. 19, the device 400 for preparing battery may include a provision module 410 configured to: provide a plurality of battery cells 20 including a first battery cell 201 and a second battery cell 202 that are adjacent, where the plurality of battery cells 20 are arranged in a first direction X, a first region on an edge of a first surface 251 of each of the plurality of battery cells 20 is recessed to form a first recess 241, a first electrode terminal 214a of each of the battery cells 20 is protrusively provided on a second surface 252 of the battery cell 20, the first surface 251 and the second surface 252 are perpendicular to the first direction X, and the plurality of battery cells 20 include a first battery cell 201 and a second battery cell 202 that are adjacent; and provide a first busbar 26, where the first busbar 26 is configured to connect a first electrode terminal 214a of the first battery cell 201 and a first electrode terminal 214a of the second battery cell 202, and the first busbar 26 bypasses a side wall of the second battery cell 202 parallel to the first direction X, so that a first end 261 of the first busbar 26 is connected to the first electrode terminal 214a of the first battery cell 201 and a second end 262 of the first busbar 26 is connected to the first electrode terminal 214a of the second battery cell 202, where the first end 261 of the first busbar 26 and the first electrode terminal 214a of the first battery cell 201 are both accommodated in the first recess 241 of the second battery cell 202.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A battery, characterized by comprising:

a plurality of battery cells, wherein the plurality of battery cells are arranged in a first direction, a first region on an edge of a first surface of each of the plurality of battery cells is recessed to form a first recess, a first electrode terminal of each of the battery cells is protrusively provided on a second surface of the battery cell, the first surface and the second surface are perpendicular to the first direction, and the plurality of battery cells comprise a first battery cell and a second battery cell that are adjacent, wherein the first region is arranged in an area on the first surface opposite to first electrode terminal;

a first busbar, configured to connect a first electrode terminal of the first battery cell and a first electrode terminal of the second battery cell, wherein the first busbar comprises a first end, a second end, and a bending portion disposed between the first end and the second end, the bending portion is configured as bendable to allow the first busbar to bypass a side wall of the second battery cell parallel to the first direction, the first end of the first busbar is connected to the first electrode terminal of the first battery cell and the second end of the first busbar is connected to the first electrode terminal of the second battery cell, the first end of the first busbar and the first electrode terminal of the first battery cell are both accommodated in the first recess of the second battery cell;

wherein each one the plurality of battery cells comprises a housing and an end cover, wherein the housing is configured to accommodate an electrode assembly of the battery cell, the end cover closes the housing to enclose the electrode assembly in the housing, a bottom wall of the housing forms the first surface of the battery cell, the end cover forms the second surface of the battery cell, a region of the end cover corresponding to the electrode assembly is raised in a direction back away from the housing, so as to form a depression in a side of the end cover facing the housing, a welding track is formed between the edge of the housing and the edge of the end cover, a contour line is formed between the raised region of the end cover and the depression, and a distance between the contour line and the welding track is greater than 0.5 mm.

2. The battery according to claim 1, characterized in that a surface of the bending portion facing the second battery cell is provided with an insulation layer.

3. The battery according to claim 2, characterized in that the insulation layer comprises an insulation patch or insulation coating.

4. The battery according to claim 1, characterized in that in the first direction, size of the first recess is greater than a sum of height of the first electrode terminal and size of the first busbar.

5. The battery according to claim 1, characterized in that in the first direction, a difference between size of the battery cell and the size of the first recess of the battery cell is greater than or equal to 2 mm.

6. The battery according to claim 1, characterized in that in a second direction, size of the first recess on the first surface is greater than or equal to 12 mm, wherein the second direction is perpendicular to a third surface of the battery cell, and the third surface is perpendicular to the first surface and the second surface.

7. The battery according to claim 1, characterized in that the depression is configured to limit a position of the electrode assembly during assembling of the electrode assembly.

8. The battery according to claim 1, characterized in that depth of the depression is between 0.4 mm and 3 mm.

9. The battery according to claim 1, characterized in that in a cross section of a plane perpendicular to the first direction, the depression is greater than or equal to the electrode assembly in size.

10. The battery according to claim 1, characterized in that a second region on an edge of the first surface is recessed to form a second recess, the first region is located at a first end of the first surface in a second direction, the second region is located at a second end of the first surface in the second direction, a second electrode terminal of each of the battery cells is protrusively provided on the second surface of the battery cell, and the second electrode terminal and the first electrode terminal are opposite in polarity, wherein the plurality of battery cells further comprises a third battery cell adjacent to the second battery cell; and the battery further comprises:

a second busbar, configured to connect a second electrode terminal of the second battery cell and a second electrode terminal of the third battery cell, wherein the second busbar comprises a first end, a second end, and a bending portion disposed between the first end and the second end, the bending portion is configured as bendable to allow the second busbar to bypass a side wall of the third battery cell parallel to the first direction, so that the first end of the second busbar is connected to the second electrode terminal of the second battery cell and the second end of the second busbar is connected to the second electrode terminal of the third battery cell, wherein the first end of the second busbar and the second electrode terminal of the second battery cell are both accommodated in the second recess of the third battery cell.

11. An electric device, characterized by comprising the battery according to claim 1, wherein the battery is configured to supply electrical energy.

12. The battery according to claim 1, wherein the bending portion is wrapped with an insulating material.

13. The battery according to claim 10, wherein the bending portion of the second busbar further comprises a first bending region, a second bending region, and an intermediate region, wherein the first bending region is configured for bending to connect the first end and the intermediate region, and the second bending region is configured for bending to connect the second end and the intermediate region, the intermediate region comprises a plurality of stiffeners parallel to the first direction.

14. The battery according to claim 1, wherein the bending portion of the first busbar further comprises a first bending region, a second bending region, and an intermediate region, wherein the first bending region is configured for bending to connect the first end and the intermediate region, and the second bending region is configured for bending to connect the second end and the intermediate region, the intermediate region comprises a plurality of stiffeners parallel to the first direction.

15. The battery according to claim 14, wherein a thickness of the first bending region and a thickness of the second bending region are less than a thickness of the intermediate region.

16. The battery according to claim 14, wherein the intermediate region is perpendicular to the first surface and the second surface.

* * * * *